(12) United States Patent
Baehrle-Miller et al.

(10) Patent No.: US 11,708,058 B2
(45) Date of Patent: Jul. 25, 2023

(54) BRAKING SYSTEM FOR A VEHICLE HAVING A HYDRAULIC VEHICLE BRAKE AND AN ELECTROMECHANICAL BRAKING DEVICE

(71) Applicant: Robert Bosch GmbH, Stuttgart (DE)

(72) Inventors: Frank Baehrle-Miller, Schoenaich (DE); Edith Mannherz, Weinsberg (DE); Julia Chen, Suzhou (CN); Karl-Josef Weiss, Bensheim (DE); Zhizhong Wang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 16/482,408

(22) PCT Filed: Feb. 12, 2018

(86) PCT No.: PCT/EP2018/053411
§ 371 (c)(1),
(2) Date: Jul. 31, 2019

(87) PCT Pub. No.: WO2018/153710
PCT Pub. Date: Aug. 30, 2018

(65) Prior Publication Data
US 2019/0344768 A1      Nov. 14, 2019

(30) Foreign Application Priority Data

Feb. 22, 2017   (CN) .................. 201710096466.X (51) Int. Cl.
*B60T 13/58*       (2006.01)
*B60T 7/08*        (2006.01)
(Continued)

(52) U.S. Cl.
CPC .............. *B60T 13/585* (2013.01); *B60T 7/08* (2013.01); *B60T 7/12* (2013.01); *B60T 13/741* (2013.01); *B60T 13/745* (2013.01); *B60T 13/746* (2013.01)

(58) Field of Classification Search
CPC . B60T 7/08; B60T 7/12; B60T 13/741; B60T 13/745; B60T 13/588;
(Continued)

(56) References Cited

U.S. PATENT DOCUMENTS

| 1,972,300 A | * | 9/1934 | Hemingway, Jr. .... B60R 25/002 70/201 |
| 2,399,868 A | * | 5/1946 | Hollerith ................. B64C 25/44 188/359 |

(Continued)

FOREIGN PATENT DOCUMENTS

| CN | 104890657 A | 9/2015 |
| DE | 10 2004 004 992 A1 | 9/2005 |

(Continued)

OTHER PUBLICATIONS

International Search Report corresponding to PCT Application No. PCT/EP2018/053411, dated Aug. 7, 2018 (German and English language document) (7 pages).

*Primary Examiner* — Nicholas J Lane
*Assistant Examiner* — San M Aung
(74) *Attorney, Agent, or Firm* — Maginot, Moore & Beck LLP (57) ABSTRACT

A braking system for a vehicle includes a hydraulic vehicle brake with an electric actuator and an electromechanical braking device. The braking system further includes a locking mechanism configured to lock the electric actuator.

16 Claims, 6 Drawing Sheets

(51) Int. Cl.
*B60T 7/12* (2006.01)
*B60T 13/74* (2006.01)

(58) Field of Classification Search
CPC .... B60T 13/585; B60T 13/746; B60T 8/4077; B60T 1/10; F16D 63/002; F16D 2123/00
USPC ...................................... 188/106 F, 158, 265
See application file for complete search history.

(56) References Cited

U.S. PATENT DOCUMENTS

| | | | | |
|---|---|---|---|---|
| 3,893,549 | A * | 7/1975 | Bennett | F16D 65/18 188/170 |
| 9,033,427 | B2 * | 5/2015 | Berger | B60T 13/58 303/11 |
| 2005/0258682 | A1 * | 11/2005 | Halasy-Wimmer | F16D 65/18 188/72.4 |
| 2006/0170282 | A1 * | 8/2006 | Yamaguchi | F16D 65/18 188/1.11 R |
| 2006/0267402 | A1 * | 11/2006 | Leiter | B60T 13/741 303/20 |
| 2007/0188018 | A1 * | 8/2007 | Reuter | B60T 8/4081 303/114.1 |
| 2010/0176652 | A1 * | 7/2010 | Arakawa | B60T 13/746 303/10 |
| 2010/0176653 | A1 * | 7/2010 | Arakawa | B60T 13/745 303/10 |
| 2013/0001027 | A1 * | 1/2013 | Baehrle-Miller | F16D 65/18 188/106 F |
| 2013/0082514 | A1 * | 4/2013 | Murakami | B60T 13/686 303/14 |
| 2013/0275019 | A1 * | 10/2013 | Murata | B60T 13/741 701/70 |
| 2015/0061362 | A1 * | 3/2015 | Kikawa | B60T 8/4077 303/14 |
| 2015/0136538 | A1 * | 5/2015 | Kim | B60T 13/588 188/72.6 |
| 2015/0367826 | A1 * | 12/2015 | Bildstein | F16D 55/2245 303/10 |

FOREIGN PATENT DOCUMENTS

| | | |
|---|---|---|
| DE | 10 2015 214 809 A1 | 2/2017 |
| JP | 2002-246226 A | 8/2002 |
| JP | 2004-010041 A | 1/2004 |
| JP | 2010-162952 A | 7/2010 |
| JP | 2015-163486 A | 9/2015 |
| WO | 2004/022394 A1 | 3/2004 |

* cited by examiner

BRAKING SYSTEM FOR A VEHICLE HAVING A HYDRAULIC VEHICLE BRAKE AND AN ELECTROMECHANICAL BRAKING DEVICE

This application is a 35 U.S.C. § 371 National Stage Application of PCT/EP2018/053411, filed on Feb. 12, 2018, which claims the benefit of priority to Serial No. CN 201710096466.X, filed on Feb. 22, 2017 in China (CN), the disclosures of which are incorporated herein by reference in their entirety.

BACKGROUND

The disclosure relates to a braking system for a vehicle with a hydraulic vehicle brake and with an electromechanical brake apparatus.

In DE 10 2004 004 992 A1 a braking system for a vehicle is described which comprises, on the one hand, a hydraulic vehicle brake and, on the other hand, an electromechanical parking-brake apparatus with an electric brake motor. The electric brake motor of the brake apparatus is integrated into a wheel brake of the hydraulic vehicle brake, said electric brake motor relocating a brake piston in the direction of a brake disk, and said brake piston also being acted upon by the hydraulic brake pressure in the event of an actuation of the vehicle brake.

When the vehicle is being parked, the parking-brake apparatus is actuated with the electric brake motor for the purpose of generating the desired parking-brake force. If the parking-brake force does not reach a demanded force-level, in accordance with DE 10 2004 004 992 A1 the hydraulic vehicle brake is actuated additionally, in order to generate an additional braking force.

SUMMARY

The braking system according to the disclosure for vehicles includes a hydraulic vehicle brake and also an electromechanical brake apparatus which exhibits at least one electric brake motor, in particular includes two electric brake motors. The hydraulic vehicle brake is actuated in regular vehicle operation in order to achieve a desired braking force for the purpose of decelerating the vehicle. The hydraulic pressure that is generated in the hydraulic vehicle brake acts on a brake piston in a wheel-brake unit. The electromechanical brake apparatus with at least one electric brake motor is preferentially actuated when the vehicle is being parked, in order to generate by electromechanical means a parking-brake force permanently immobilizing the vehicle. In an advantageous embodiment, the electric brake motor of the electromechanical brake apparatus acts on the same brake piston as the hydraulic vehicle brake.

The hydraulic vehicle brake exhibits an electric actuator with which the hydraulic pressure can be influenced. The actuator is capable of being triggered electrically, so that the hydraulic pressure in the vehicle brake can be increased via an electrical triggering of the actuator. The electric actuator is, for instance, part of a brake-force booster with which the driver influences the hydraulic pressure in the vehicle brake via an actuation of the brake pedal. With the aid of the electric actuator the brake-force booster boosts the hydraulic pressure generated by the driver.

The braking system according to the disclosure further includes a latching mechanism which has been assigned to the electric actuator of the hydraulic vehicle brake or to a transmission device capable of being actuated by the actuator. With the aid of the latching mechanism, in the parking position of the vehicle the hydraulic pressure can be preserved by the actuator being blocked. In this connection the latching mechanism has the advantage that after the latching no supply of energy is required for the permanent retention of the hydraulic pressure, since the latching of the actuator or of the transmission device, which is connected downstream of the actuator, is undertaken by mechanical means. Consequently, during the parking of the vehicle a sufficiently high parking-brake force is permanently guaranteed, regardless of the operability of the electrical components or of the control unit of the electromechanical brake apparatus. The latching mechanism consequently creates a mechanical linkage between the hydraulic vehicle brake and the electromechanical brake apparatus, and enables, particularly in the event of a malfunction of a component of the electromechanical brake apparatus or of an assigned control unit, the permanent generating of a parking-brake force. The electric actuator is also, in particular, autonomous and consequently capable of being triggered without driver actuation.

According to an advantageous embodiment, the electric actuator of the hydraulic vehicle brake includes an electric motor which drives a drive mechanism constituting the transmission device, in which connection either the electric motor or the drive mechanism is capable of being latched via the latching mechanism. Advantageously, the electric motor and the drive mechanism are an integral part of the brake-force booster (iBooster) to be acted upon by the brake pedal. The electric actuator is capable of being triggered independently of the actuation of the brake-force booster via the brake pedal, so that even without driver activity the electric actuator can be triggered in order to generate an increased hydraulic pressure which is subsequently frozen via the actuation of the latching mechanism and the blocking of the actuator.

According to a further expedient embodiment, the latching mechanism includes an electromagnetic positioning device with a locking pawl which is relocatable between a release position and a locking position. The activation of the positioning device is undertaken by supply of current, whereupon an electromagnetic force is generated which relocates the locking pawl. Advantageously, when current is being supplied to the positioning device the transfer occurs of the locking pawl from the release position into the locking position in which the electric actuator has been latched. In addition, it may be advantageous also to bring about the relocation in the opposite direction—that is to say, from the locking position into the release position—by a correspondingly reversed supply of current to the positioning device.

In the electromagnetic positioning device a permanent magnet may have been arranged which acts on the locking pawl in the direction of the locking position. This embodiment has the advantage that for the transfer motion of the locking pawl from the release position into the locking position merely a supply of current to the electromagnetic positioning device is required. After the locking pawl has reached the locking position, the locking pawl is held in the locking position by the permanent magnet, and the current in the electromagnetic positioning device can be switched off, without this resulting in a return of the locking pawl into the release position. By this means, it is guaranteed that the locking pawl of the latching mechanism remains in the locking position even without permanent supply of current.

According to yet another expedient embodiment, the locking pawl of the latching mechanism in the locking position blocks a toothed gear of the drive mechanism which has been connected downstream of the electric motor and is located, in particular, in the transmission path between the electric motor and the brake-force booster. In the locking position the locking pawl projects into the tooth profile of the toothed gear of the drive mechanism, so that a rotational motion of the toothed gear of the drive mechanism in the direction of a reduced hydraulic pressure is blocked. The toothed gear of the drive mechanism may have been connected in torsion-resistant manner to the shaft of the electric motor.

The brake-force booster advantageously includes a master cylinder, particularly in the embodiment as a tandem cylinder, via which one or two brake circuits of the hydraulic vehicle brake are supplied with hydraulic pressure. The master brake cylinder is relocated by the brake pedal, in the course of which a positioning rod on which the brake pedal acts relocates the master brake cylinder. In addition, the master brake cylinder may be relocatable via an axial positioning motion of a spindle which is supported in an axially fixed but rotatable spindle nut which is driven by the electric motor via the drive mechanism. Consequently the rotational motion of the electric motor is translated via the drive mechanism and the spindle nut into an axial positioning motion of the spindle, which acts as boosting motion on the master brake cylinder.

Inasmuch as the locking pawl blocks the electric motor or the drive mechanism, the current axial position of the spindle is arrested, and the hydraulic pressure prevailing in this position is frozen.

As an alternative to a blocking of a toothed gear of the drive mechanism via the locking pawl, it is also possible that a toothed gear which is not part of the drive mechanism, and in the tooth system of which the locking pawl engages in latching manner, is seated in torsion-resistant manner on the shaft of the electric motor. This embodiment has the advantage that the drive mechanism or the connection between the electric motor and the drive mechanism is independent of and unaffected by the latching mechanism. Merely an additional toothed gear has to be arranged on the shaft of the motor, said toothed gear being assigned to the locking pawl of the latching mechanism.

According to yet another expedient embodiment, the toothed gear that is seated in torsion-resistant manner on the shaft of the motor has a sawtooth profile which has been designed in such a way that a further rotation of the toothed gear is possible only in the direction of a higher hydraulic pressure but is blocked in the opposite direction. The teeth of the toothed gear exhibit, corresponding to the sawtooth profile, sawteeth inclined in a peripheral direction, so that the toothed gear slips beneath the locking pawl in the event of a further rotation in this peripheral direction, whereas in the event of a reversal of the direction of rotation the locking pawl bears against the steep flanks of the sawteeth and makes a slipping of the toothed gear impossible.

According to an alternative embodiment, the toothed gear connected to the shaft of the motor exhibits teeth that have a symmetrical triangular profile. This embodiment has the advantage that, although the higher brake pressure which is attained remains frozen in the locking position of the locking pawl, when the electric motor is being actively reversed the toothed gear slips beneath the locking pawl, so that the hydraulic pressure can be reduced. Conversely, an increase of the brake pressure by a corresponding triggering of the electric motor is also possible, by the toothed gear slipping beneath the locking pawl in the corresponding direction of rotation.

According to yet another expedient embodiment, the braking system exhibits an actuating switch via which the latching mechanism can be switched on manually and additionally, where appropriate, can also be switched off. The actuating switch is, in particular, present independently of a parking-brake switch via which the driver can activate the parking-brake function.

In an alternative embodiment, the latching mechanism is not triggered manually by the driver but triggered automatically via positioning signals of a control unit, in particular if it is detected in the control unit that a malfunction is present in an electric component of the braking system, in particular in the electromechanical brake apparatus.

In the case of the method for generating the parking-brake force, after the parking of the vehicle the electric actuator of the hydraulic vehicle brake is actuated for the purpose of increasing the hydraulic pressure. After a defined hydraulic pressure has been attained, the current position of the electric actuator is blocked by the latching mechanism. The actuation of the actuator and the blocking of the actuator are preferentially carried out in the case of a malfunction of a component of the electromechanical brake apparatus. Alternatively it is also possible, even in the case of proper operability of the electromechanical brake apparatus, to actuate the electric actuator of the hydraulic vehicle brake and to arrest the position of the actuator with the aid of the latching mechanism.

A malfunction in the electromechanical brake apparatus can be established, for instance, via the level of the currently attainable parking-brake force. If a desired parking-brake force cannot be provided by the electromechanical brake apparatus, which can be established, for instance, on the basis of the motor current of the electric brake motor, the electric actuator is actuated and the latching mechanism is triggered.

According to yet another expedient embodiment, the blocking of the electric actuator by the latching mechanism is canceled with the termination of the parking. For this purpose, the latching member—in particular, the locking pawl of the latching mechanism—is relocated out of the locking position into the release position.

The various steps of the method proceed in a regulating unit or control unit which is an integral part of the braking system. In this connection it is a question, for instance, of an ESP (electronic stability program) control unit in which, where appropriate, the triggering of the latching mechanism is also carried out.

Additionally or alternatively, it may also be a question of a control unit of the brake-force booster which includes the electrically controllable actuator, or of some other control unit. It is possible and, where appropriate, expedient to trigger the latching mechanism via the control unit of the brake-force booster or via some other control unit, for example of an airbag or in the steering system of the vehicle. Particularly in the case where the control unit responsible for the electromechanical brake apparatus becomes inoperative, the latching mechanism can be triggered via another, intact control unit.

BRIEF DESCRIPTION OF THE DRAWINGS

Further advantages and expedient embodiments can be gathered from the further claims, from the description of the figures and from the drawings. Shown are:

DETAILED DESCRIPTION

In the figures, identical components have been provided with identical reference symbols.

Figure 1:
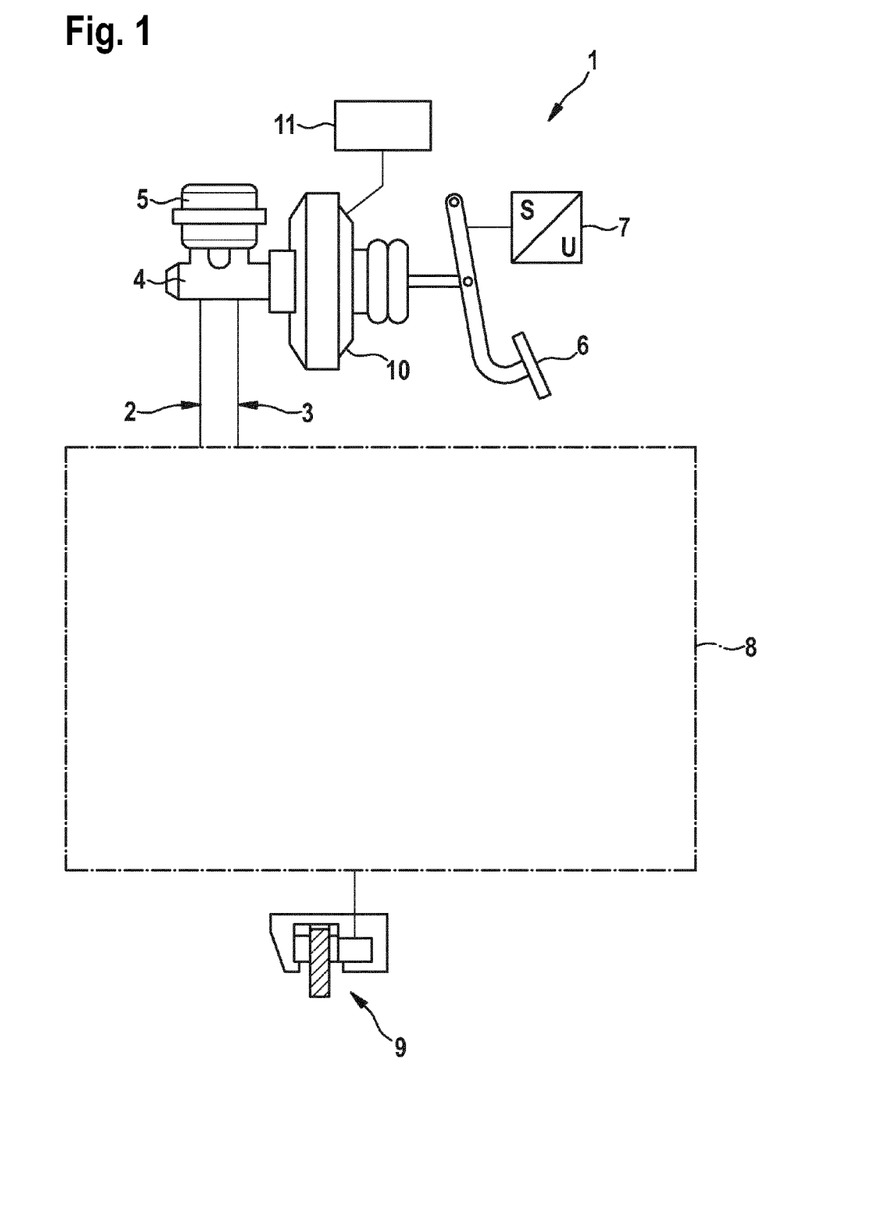
FIG. 1 a schematic representation of a hydraulic vehicle brake with a brake-force booster, wherein the wheel-brake devices of the vehicle brake on the rear axle of the vehicle are additionally equipped with an electromechanical brake apparatus with an electric brake motor, FIG. 2 a section through an electromechanical brake apparatus with an electric brake motor, FIG. 3 a section through a brake-force booster with electromotive boosting and with a latching mechanism which acts on a toothed gear of the drive mechanism, FIG. 4 a section through a brake-force booster corresponding to FIG. 3, the latching mechanism of which acts a toothed gear seated on the shaft of the electric motor, FIG. 5 the toothed gear in an embodiment having a sawtooth profile, FIG. 6 the toothed gear in an embodiment with teeth having a symmetrical triangular profile, FIG. 7 a flowchart for manual latching and unlatching of the latching mechanism, FIG. 8 a flowchart for automatic latching and unlatching of the latching mechanism.

The hydraulic vehicle brake 1, represented in FIG. 1, for a vehicle includes a front-axle brake circuit 2 and a rear-axle brake circuit 3 for supplying and triggering wheel-brake devices 9 on each wheel of the vehicle with a brake fluid under hydraulic pressure. The brake circuits may also take the form of two diagonal brake circuits, each with a front wheel and with a rear wheel arranged diagonally in relation thereto.

The two brake circuits 2, 3 are coupled to a common master brake cylinder 4 which is designed as a tandem cylinder and is supplied with brake fluid via a brake-fluid storage reservoir 5. The master-brake-cylinder piston within the master brake cylinder 4 is actuated by the driver via the brake pedal 6; the pedal travel executed by the driver is measured via a pedal-travel sensor 7. Between the brake pedal 6 and the master brake cylinder 4 there is located a brake-force booster 10 which includes, for instance, an electric motor which actuates (iBooster) the master brake cylinder 4 via a drive mechanism. The brake-force booster 10 constitutes an active brake component for influencing the hydraulic brake pressure.

The positioning motion of the brake pedal 6 measured by the pedal-travel sensor 7 is communicated as sensor signal to a control unit 11 of the braking system, in which positioning signals for triggering the brake-force booster 10 are generated. The supply of the wheel-brake devices 9 with brake fluid is undertaken in each brake circuit 2, 3 via various switching valves which, together with further units, are part of brake hydraulics 8. The brake hydraulics 8 include, moreover, a hydraulic pump which is an integral part of an electronic stability program (ESP). The hydraulic pump is also an active brake component for influencing the hydraulic brake pressure.

Figure 2:
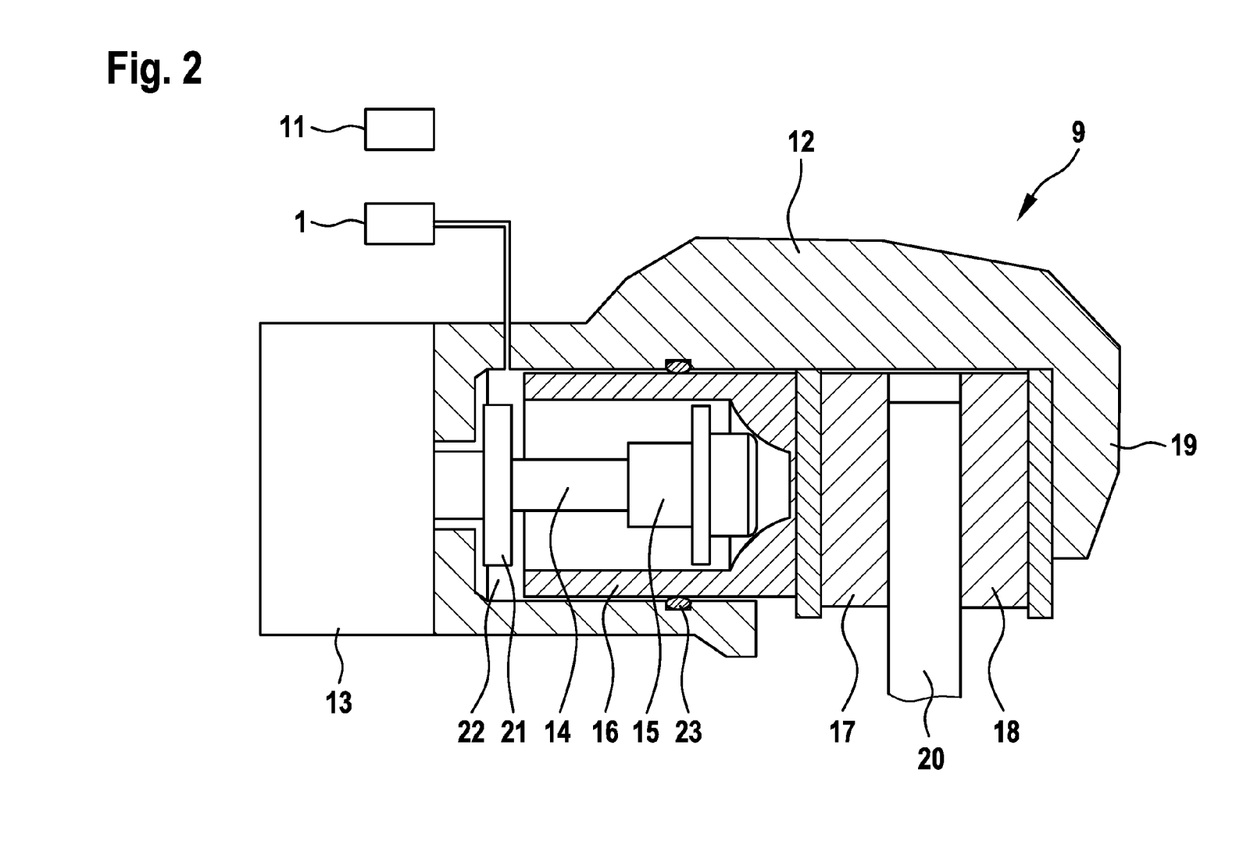

In FIG. 2 a wheel-brake device 9, which is arranged on wheels on the rear axle of the vehicle, is represented in detail. The wheel-brake device 9 is part of the hydraulic vehicle brake 1 and is supplied with brake fluid 22 from the rear-axle brake circuit. The wheel-brake device 9 exhibits, in addition, an electromechanical brake apparatus which is preferably employed as parking brake for the purpose of immobilizing a vehicle at a standstill but can also be employed when the vehicle is moving, in particular at relatively low vehicle speeds below a speed limit, for the purpose of decelerating the vehicle. Wheel-brake devices 9 of such a type may, where appropriate, also have been arranged on the wheels of the front axle of the vehicle.

The electromechanical brake apparatus includes a brake caliper 12 with a clamp 19 which overlaps a brake disk 20. By way of positioning member, the brake apparatus exhibits a motor/drive-mechanism unit with a DC electric motor as brake motor 13, the rotor shaft of which drives a spindle 14 in rotation on which a spindle nut 15 is supported in rotationally fixed manner. In the course of a rotation of the spindle 14, the spindle nut 15 is relocated axially. The spindle nut 15 moves within a brake piston 16 which is a carrier of a brake pad 17 which is pressed against the brake disk 20 by the brake piston 16. Located on the opposing side of the brake disk 20 is a further brake pad 18 which is held in stationary manner on the clamp 19. On its outside the brake piston 16 is sealed in pressure-tight manner in relation to the receiving housing via an encompassing sealing ring 23.

Within the brake piston 16 the spindle nut 15 can move axially forward in the direction toward the brake disk 20 in the course of a rotary motion of the spindle 14, or can move axially to the rear until reaching an end stop in the course of an opposed rotary motion of the spindle 14. For the purpose of generating a clamping force, the spindle nut 15 acts on the inner front side of the brake piston 16, as a result of which the brake piston 16, which is supported in axially displaceable manner in the brake apparatus, is pressed with the brake pad 17 against the facing front face of the brake disk 20. The spindle nut 15 constitutes a transmission member between the brake motor and the brake piston.

For the hydraulic braking force, the hydraulic pressure of the brake fluid 22 from the hydraulic vehicle brake 1 acts on the brake piston 16. The hydraulic pressure may also be effective in assisting manner at a standstill of the vehicle upon actuation of the electromechanical brake apparatus, so that the total braking force is composed of the electromotively supplied component and the hydraulic component. During the travel of the vehicle, either only the hydraulic vehicle brake is active, or both the hydraulic vehicle brake and the electromechanical brake apparatus or only the electro-mechanical brake apparatus are/is active, in order to generate braking force. The positioning signals for triggering both the adjustable components of the hydraulic vehicle brake 1 and the electromechanical wheel-brake device 9 are generated in the control unit 11.

Figure 3:
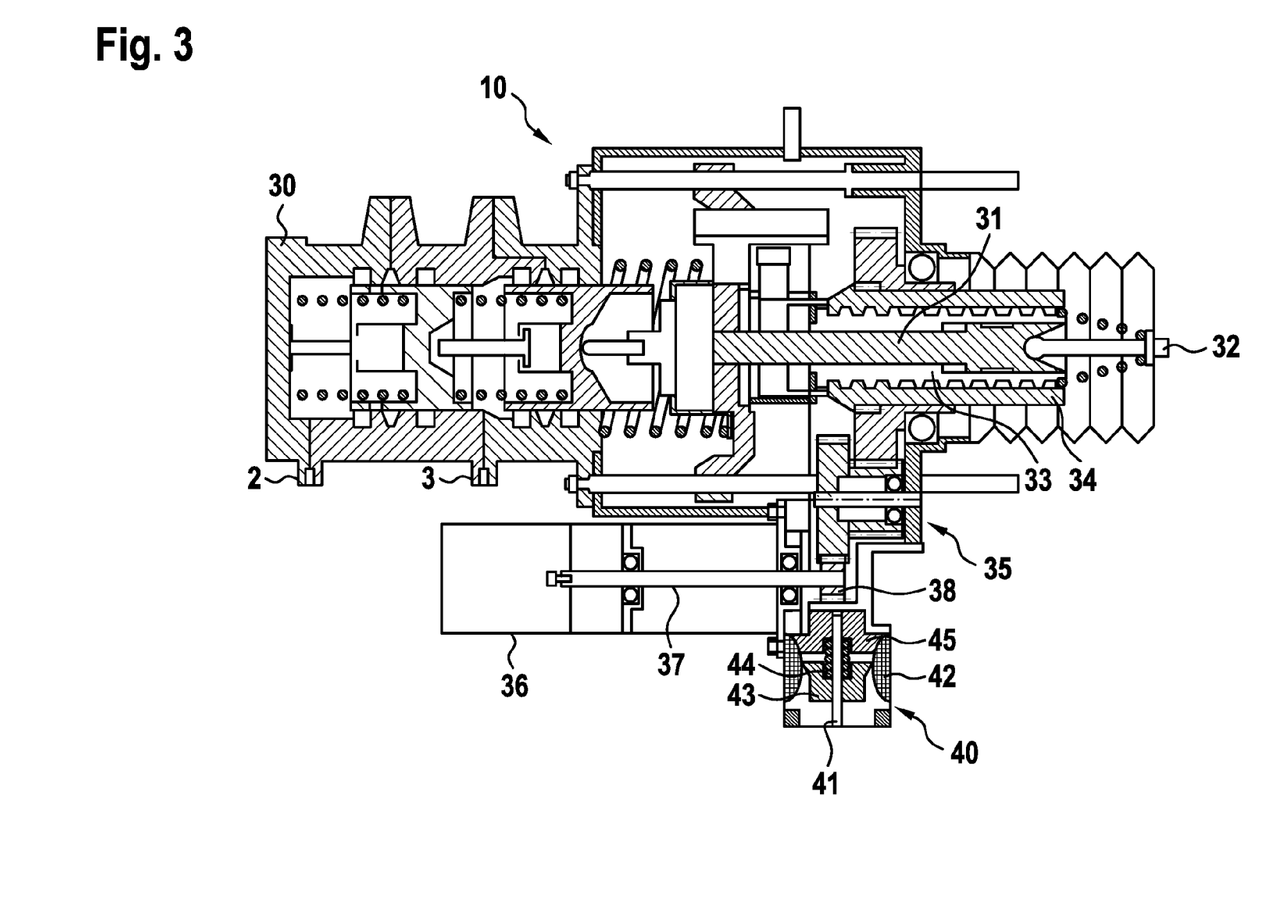

In FIG. 3 the brake-force booster 10 is represented in section in its embodiment as an iBooster. The brake-force booster 10 includes a master brake cylinder 30, taking the form of a tandem cylinder, for supplying the brake circuits 2 and 3 with a hydraulic pressure. The master brake cylinder 30 is actuated via a positioning rod 31 which is connected to a rod 32 which pertains to the brake pedal 6 (FIG. 1). Upon an actuation of the brake pedal, the positioning rod 31 is axially displaced and the master brake cylinder 30 is actuated for the purpose of generating an increased hydraulic pressure.

The brake-force booster 10 exhibits, in addition, an electromechanical booster which includes an electric motor 36 and a drive mechanism 35. The positioning rod is received in a spindle 33 which is supported in a spindle nut 34, said spindle 33 and said spindle nut 34 being coupled via a screw thread. The spindle nut 34 is rotatably supported but arranged so as to be axially fixed with respect to the housing, and is driven by the drive mechanism 35. In the course of a rotation of the electric motor 36, the rotary motion of the motor shaft 37 is transmitted via a drive-mechanism toothed gear 38, which is seated in torsion-resistant manner on the motor shaft 37, to the drive mechanism 35, the rotary motion of which is transmitted on the output side to the spindle nut 34. The rotary motion of the spindle nut 34 is translated into an axial positioning motion of the spindle 33, which acts on the master brake cylinder 30.

In addition, a latching mechanism 40 which permits the electric motor 36 and the drive mechanism 35 to be arrested or latched in a certain position has been assigned to the brake-force booster 10. This makes it possible to freeze a certain hydraulic pressure in the hydraulic vehicle brake, in particular at a standstill of the vehicle, so that a parking-brake force is generated permanently via the hydraulic vehicle brake.

The latching mechanism 40 includes an electromagnetic positioning device with a locking pawl 41 which is translationally relocatable between a release position and a locking position. The direction of relocation of the locking pawl 41 is orthogonal to the longitudinal axis of the electric motor 36 and also orthogonal to the direction of positioning of the master brake cylinder 30. In FIG. 3 the locking pawl 41 has been relocated in its retracted release position, in which the drive-mechanism toothed gear 38 is unaffected by the locking pawl 41. Upon an actuation of the latching mechanism 40, the locking pawl 41 is relocated into the locking position in which the locking pawl 41 engages in arresting manner in the tooth system of the drive-mechanism toothed gear 38, so that a resetting of the electric motor 36 and hence also of the spindle 33 for reducing the frozen hydraulic pressure is ruled out.

The latching mechanism 40 is of electromagnetic design and exhibits an energizable toroidal coil 42, upon the energization of which an armature 43, which is seated on the locking pawl 41, is relocated axially in the direction of the locking position. The armature 43, inclusive of the locking pawl 41, are forced into the release position by a spring element 44. Upon energization of the toroidal coil 42, the armature 43 is relocated from the release position into the locking position contrary to the force of the spring element 44.

The latching mechanism 40 includes, moreover, a permanent magnet 45 which is arranged in the latching mechanism 40 on the side facing toward the drive-mechanism toothed gear 38. With the reaching of the locking position, the armature 43 bears against the permanent magnet 45 and is attracted by the latter. The magnetic force of the permanent magnet 45 is big enough that, even after the supply of current to the toroidal coil 42 has been switched off, the armature 43 is held in the locking position despite the spring force 44.

For the purpose of disengaging the locking position, the toroidal coil 42 is energized in the opposite direction, as a result of which the armature 43 is relocated from the locking position into the release position by the generated magnetic field.

The triggering of the latching mechanism 40 is undertaken via a control unit of the brake-force booster.

Figure 4:
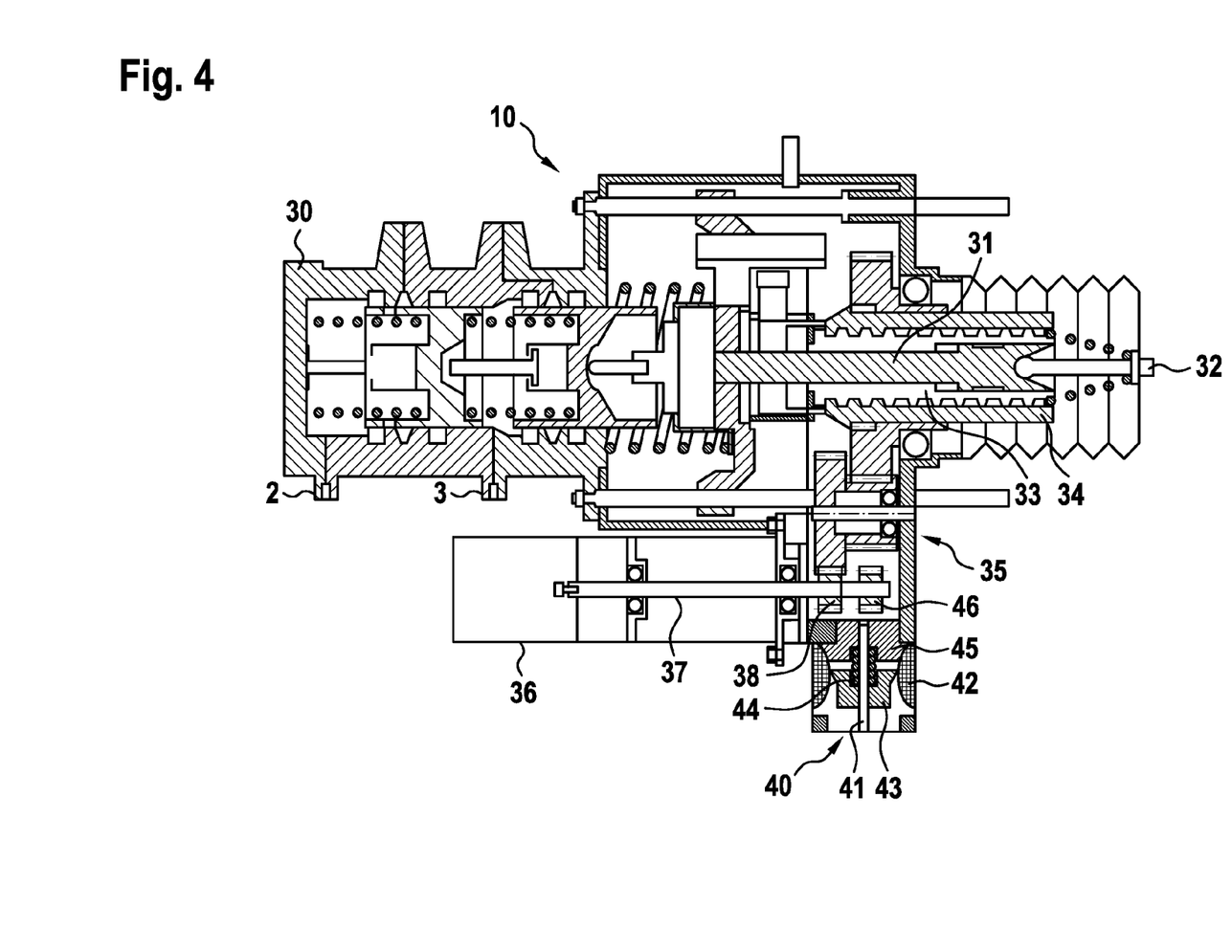

The brake-force booster 10 represented in FIG. 4 exhibits basically the same structure as that according to FIG. 3. Different, however, is the structural design of the blocking of the electric motor 36 or of the drive mechanism 35 with the aid of the latching mechanism 40. On the motor shaft 37 there is seated, on the one hand, the drive-mechanism toothed gear 38, via which the drive motion of the motor shaft 37 is transmitted to the drive mechanism 35. On the other hand, on the motor shaft 37 there is seated, with greater axial spacing, an additional toothed gear 46 which is connected in torsion-resistant manner to the motor shaft 37 and is located adjacent to the free front side of the motor shaft 37.

The additional toothed gear 46 serves for blocking, and interacts with the locking pawl 41 of the latching mechanism 40. In the locking position the locking pawl 41 engages in the tooth system of the toothed gear 46 and by this means blocks the rotary motion of the electric motor 36.

The blocking of the rotary motion of the electric motor can be undertaken in both directions of rotation of the electric motor. On the other hand, in FIG. 5 an embodiment variant of a toothed gear 46 seated on the motor shaft is represented, the tooth system of which is designed as a sawtooth profile 47 with teeth inclined in the peripheral direction. The locking pawl 41 exhibits at its tip a beveled profile 48 which has been adapted to the more greatly beveled side of the sawtooth profile 47.

Figure 5:
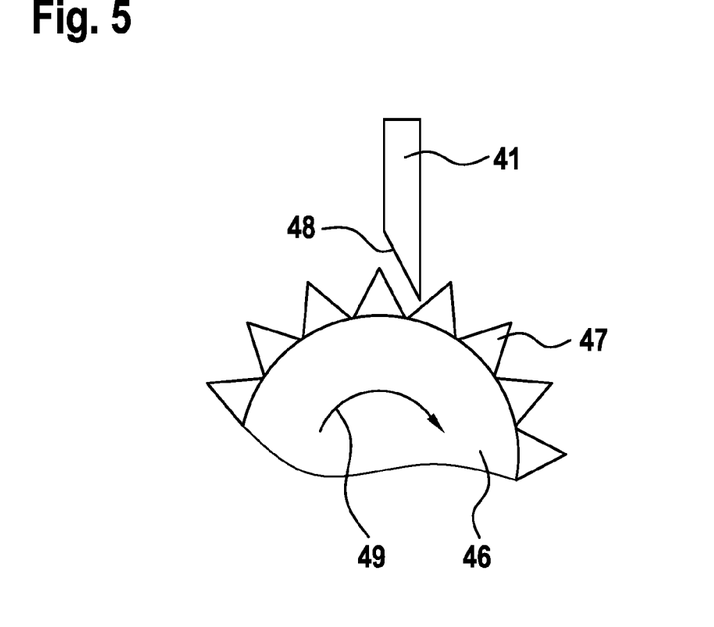

This enables a slipping of the toothed gear 46 in the direction of rotation 49, in the case of which it is a question of the direction of application and the generating of a higher hydraulic pressure. Consequently it is possible to increase the hydraulic pressure even with the locking pawl 41 in the locking position. In the opposite direction of rotation, on the other hand, the rotary motion of the toothed gear 46 is blocked, so that the hydraulic pressure has been permanently frozen.

Figure 6:
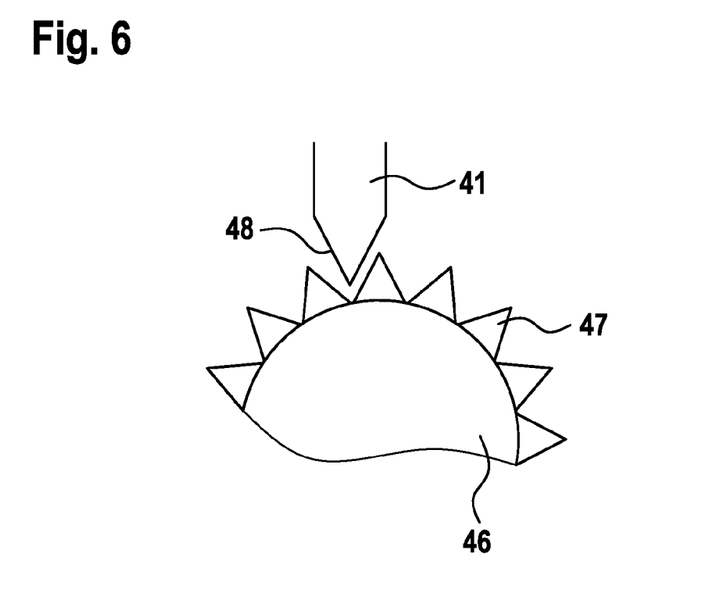

In the embodiment variant according to FIG. 6 the tooth profile 47 of the toothed gear 46 takes the form of a symmetrical triangular profile. The tip of the locking pawl 41 also has a symmetrical triangular profile 48. This embodiment makes it possible, even with the locking pawl 41 in the locking position, to rotate the toothed gear 46 in both directions upon actuation of the electric motor 36. The motor torque generated by the electric motor 36 is high enough that the toothed gear 46 is able to slip beneath the projecting locking pawl 41 in both directions of rotation. Consequently it is possible, despite the projecting locking pawl, both to increase the hydraulic pressure and to reduce the hydraulic pressure.

Figure 7:
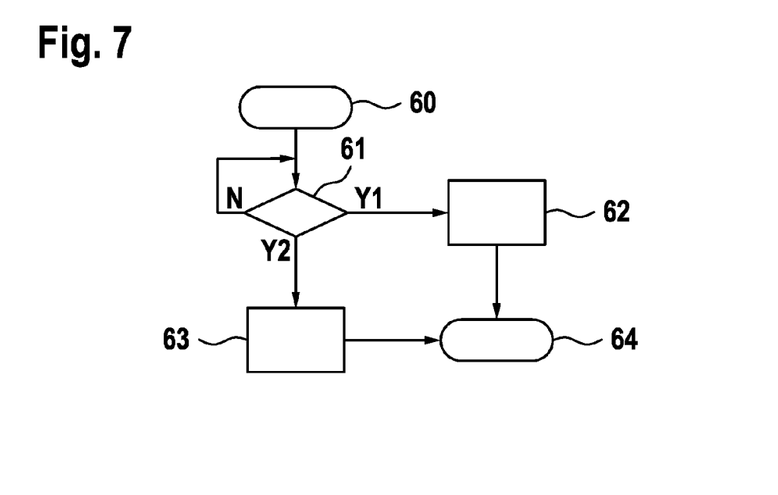

In FIG. 7 a flowchart is represented for manual latching and unlatching of the latching mechanism and correspondingly for transferring the locking pawl between the release position and the locking position. After the start of the method in the first step 60, in the next step 61 the query ensues as to whether or not an actuating switch for manual actuation of the latching mechanism has been actuated. If the actuating switch is in the non-actuated state, the program flow is returned again, following the no-branch ("N"), to the beginning of the query according to step 61, and this query is passed through again at regular intervals. If, on the other hand, the query in step 61 reveals that the actuating switch has been actuated in such a way that a permanent parking-brake force is to be generated, the program flow is advanced, following the Y1 branch, to the next step 62, and the latching mechanism is triggered, so that the locking pawl is relocated from the release position into the locking position and blocks the electric motor. Subsequently the method has been concluded in step 64.

If, on the other hand, the query in step 61 reveals that, starting from an already parked state, the latching mechanism is to be disengaged by an appropriate actuation of the actuating switch, the program flow is advanced, following the Y2 branch, to the next step 63, and the latching mechanism is disengaged. Correspondingly, the locking pawl is transferred from the locking position into the release position; subsequently the method has been concluded in step 64.

Figure 8:
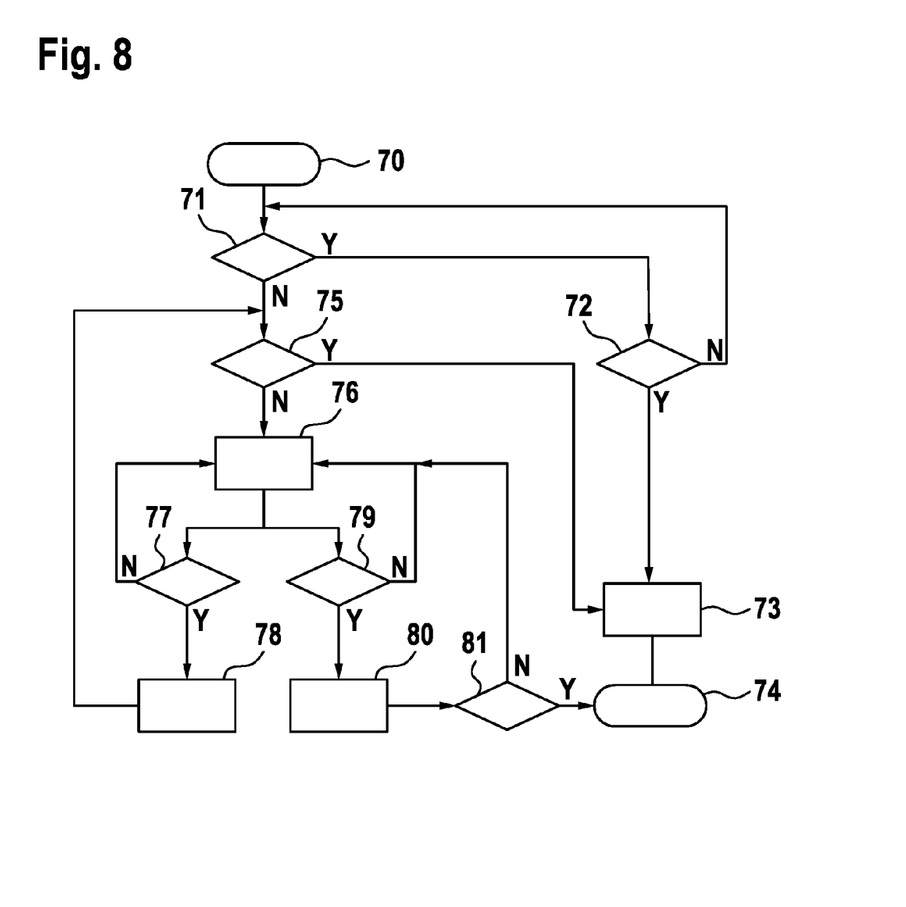

In FIG. 8 a flowchart having method steps for automatic latching and unlatching of the latching mechanism is represented, the triggering of which depends on a parking-brake switch. The parking-brake switch is actuated by the driver for the purpose of activating or deactivating the electromechanical brake apparatus.

After the start of the method in step 70, in the next step 71 there follows the query as to whether the ESP control unit is available. If this is the case, the program flow is advanced, following the yes-branch ("Y"), to the next step 72, and it is queried there whether the ignition in the vehicle has been switched off. If this is not the case, a return to step 71 occurs, according to the no-branch, and the query as to whether the ESP control unit is available is carried out again at regular intervals. If, on the other hand, the query in step 72 reveals that the ignition has been switched off, the program flow is advanced, following the yes-branch, to the next step 73, and the latching mechanism 40 is relocated into the latching position via a triggering of the ESP control unit, so that the locking pawl is transferred from the release position into the locking position. Hence the hydraulic pressure in the hydraulic vehicle brake has been frozen, and the method is concluded in the next step 74.

If, on the other hand, the query in step 71 reveals that the ESP control unit is not available, the program flow is advanced, following the no-branch, to the next step 75, and it is queried here whether the ignition has been switched off. If this is the case, the program flow is advanced, following the yes-branch, to step 73, and the latching mechanism is triggered in the manner previously described. Otherwise, the program flow is advanced, following the no-branch, to the next step 76, in which the state of the parking-brake switch is read in.

In step 77 it is queried whether the parking-brake switch has been actuated for the purpose of unlatching the latching mechanism and for transferring the locking pawl into the release position. If this is not the case, the program flow returns again, following the no-branch, to step 76, and the current state of the parking-brake switch is read in again there at cyclic intervals. If, on the other hand, the query in step 77 reveals that the parking-brake switch has been actuated for the purpose of unlatching the latching mechanism, the program flow is advanced, following the yes-branch, to step 78, and the unlatching of the latching mechanism is carried out. Subsequently the program flow returns to step 75, and it is queried regularly whether the ignition of the engine has been switched off.

In step 79, which likewise ensues upon the reading of the state of the parking-brake switch in step 76, the query ensues as to whether the parking-brake switch has been actuated in the direction of the latching of the latching mechanism. If this is not the case, the program flow returns again, following the no-branch, to step 76, and the state of the parking-brake switch is read in at cyclic intervals. If, on the other hand, the query in step 79 reveals that the latching mechanism is to be actuated in the direction of latching, the program flow is advanced, following the yes-branch, to step 80, and the latching mechanism is triggered there, so that the locking pawl is relocated from the release of the locking position. Subsequently the program flow is advanced to step 81, and it is queried whether the ignition has been switched off. If this is not the case, the program flow returns again to step 76, and the state of the parking-brake switch is read in at cyclic intervals. If, on the other hand, the query in step 81 reveals that the ignition has been switched off, the program flow is advanced to step 74; the method has been concluded.

The invention claimed is:

1. A braking system for a vehicle, comprising:
   a hydraulic vehicle brake with an electric actuator configured to influence hydraulic pressure in at least one wheel brake so as to hydraulically actuate the at least one wheel brake;
   an electromechanical brake apparatus with at least one electric brake motor, the electromechanical brake apparatus configured to electromechanically actuate the at least one wheel brake;
   a latching mechanism assigned to one of the electric actuator and a transmission device actuated by the electric actuator; and
   at least one control unit configured to operate the latching mechanism in response to initiation of a parking brake operation to lock the one of the electric actuator and the transmission device so as to retain the hydraulic pressure in the at least one wheel brake.

2. The braking system as claimed in claim 1, wherein the electric actuator of the hydraulic vehicle brake includes an electric motor that drives a drive mechanism of the transmission device that transmits torque from the electric motor to influence the hydraulic pressure, and the latching mechanism is configured to lock the electric motor or the drive mechanism.

3. The braking system as claimed in claim 2, wherein the latching mechanism includes an electromagnetic positioning device with a locking pawl that is relocatable between a release position and a locking position, and the at least one control unit is configured to operate the electromagnetic positioning device to move the locking pawl into the locking position to lock the electric motor or the drive mechanism.

4. The braking system as claimed in claim 3, wherein the electromagnetic positioning device includes a permanent magnet that acts on the locking pawl so as to urge the locking pawl in a direction toward the locking position.

5. The braking system as claimed in claim 3, wherein, in the locking position, the locking pawl of the latching mechanism blocks a toothed gear of the drive mechanism.

6. The braking system as claimed in claim 3, wherein, in the locking position, the locking pawl of the latching mechanism blocks a toothed gear that is connected in a torsion-resistant manner to a motor shaft of the electric motor and that meshes with a gear of the drive mechanism.

7. The braking system as claimed in claim 6, wherein the toothed gear connected to the motor shaft has a sawtooth profile configured such that, when the locking pawl is blocking the toothed gear, further rotation of the toothed gear is possible only in a direction toward increasing the hydraulic pressure.

8. The braking system as claimed in claim 6, wherein the toothed gear connected to the motor shaft includes teeth having a symmetrical triangular profile.

9. The braking system as claimed in claim 5, wherein the electric actuator is part of a brake-force booster configured to be acted upon by a brake pedal, and the drive mechanism transmits torque from the electric motor to the brake-force booster.

10. The braking system as claimed in claim 1, further comprising an actuating switch configured to be manually operated to initiate the parking brake operation.

11. A method for generating a parking-brake force in a braking system that includes a hydraulic vehicle brake with an electric actuator configured to influence hydraulic pressure in at least one wheel brake so as to hydraulically actuate the at least one wheel brake, an electromechanical brake apparatus with at least one electric brake motor, the electromechanical brake apparatus configured to electromechanically actuate the at least one wheel brake, and a latching mechanism assigned to one of the electric actuator and a transmission device actuated by the electric actuator so as to transmit torque to influence the hydraulic pressure, the method comprising:

after initiation of a parking brake operation, actuating the electric actuator of the hydraulic vehicle brake to increase the hydraulic pressure in the at least one wheel brake; and after the hydraulic pressure has been increased to a defined hydraulic pressure, blocking a current position of the electric actuator with the latching mechanism so as to retain the hydraulic pressure in the at least one wheel brake.

12. The method as claimed in claim 11, wherein the electric actuator of the hydraulic vehicle brake is actuated and the latching mechanism is triggered in response to detecting that a desired parking-brake force cannot be provided via the electromechanical brake apparatus.

13. The method as claimed in claim 11, further comprising canceling the blocking of the electric actuator of the hydraulic vehicle brake by relocating the latching mechanism into a release position at the termination of the parking brake operation.

14. The braking system as claimed in claim 1, wherein the electromechanical brake apparatus is arranged at the at least one wheel brake.

15. The braking system as claimed in claim 1, wherein the at least one control unit includes a first control unit configured to trigger the electromechanical brake apparatus, and a second control unit configured to trigger the electric actuator of the hydraulic vehicle brake and the latching mechanism independently of the first control unit.

16. The braking system as claimed in claim 1, wherein the at least one control unit is further configured to, after initiation of the parking brake operation and before operating the latching mechanism, actuate the electric actuator of the hydraulic vehicle brake to increase the hydraulic pressure in the at least one wheel brake.

* * * * *